United States Patent [19]

Taig

[11] 4,274,268
[45] Jun. 23, 1981

[54] UNIVERSAL JOINT

[75] Inventor: Alistair G. Taig, South Bend, Ind.

[73] Assignee: The Bendix Corporation, Southfield, Mich.

[21] Appl. No.: 54,365

[22] Filed: Jul. 2, 1979

[51] Int. Cl.³ .............................................. F16D 3/02
[52] U.S. Cl. .................................... 64/7; 64/27 NM; 403/131; 308/72
[58] Field of Search ...................... 64/7, 27 NM, 11 R; 403/128, 129, 130, 131; 308/72

[56] References Cited

U.S. PATENT DOCUMENTS

| | | | |
|---|---|---|---|
| 2,885,235 | 5/1959 | Moskovitz | 403/131 |
| 3,041,094 | 6/1962 | Herbenar | 403/130 |
| 3,263,445 | 8/1966 | Dunn | 308/72 |
| 3,431,751 | 3/1969 | Stokely | 64/7 |
| 3,555,851 | 1/1971 | Ulderup | 64/11 R |
| 4,154,544 | 5/1979 | Gair | 403/131 |

Primary Examiner—Ronald H. Lazarus
Assistant Examiner—Magdalen Moy
Attorney, Agent, or Firm—Paul David Schoenle; Ken C. Decker

[57] ABSTRACT

A universal joint between a pair of members provides for transmitting torque between the pair of members when the pair of members are oriented at varying angles relative to each other. One of the members terminates in a cavity which is substantially cylindrical. The other member extends into the cavity and a pair of sockets cooperate with the other member to secure the latter within the cavity. The pair of sockets includes outer surfaces which substantially match the wall of the cavity to enable the pair of sockets to rotate in a first plane relative to the one member. The pair of sockets include projections which are received in an opening on the other member to enable the other member to pivot relative to the pair of sockets and the one member in a second plane substantially perpendicular to the first plane. At least one spring clip cooperates with the other member and the pair of sockets to bias the pair of sockets into engagement with the wall of the cavity. The spring clip is removable to permit the pair of sockets and the other member to be withdrawn from the cavity.

3 Claims, 4 Drawing Figures

UNIVERSAL JOINT

BACKGROUND OF THE INVENTION

A steering shaft assembly includes a first member coupled to a steering wheel and a second member coupled to a steering gear. A universal joint between the first and second members provides for an angular orientation between the members as the steering wheel is positioned to accomodate a vehicle operator and the steering gear is positioned to accomodate space within an engine compartment.

Heretofore, the first and second members were formed with U-shaped ends to receive a block. The block and each U-shaped end carried a plurality of ball bearings to provide variable orientation between the first and second members. Each ball bearing was positioned between the block and an arm of the U-shaped end before a bolt was secured to the block to assemble the universal joint. Because of the number of parts, the resulting universal joint required considerable time to assemble, thereby adding to the total cost of the assembled universal joint.

It is believed to be an advance in the state of the art to provide a simple and economical universal joint which is light weight and self-lubricating.

SUMMARY OF THE INVENTION

The invention herein provides a universal joint for a pair of members which transmit torque therebetween. One of the members terminates in a cavity for receiving a portion of the other member. A pair of sockets are rotatably disposed within the cavity to provide for rotation of the pair of sockets in a first plane relative to the one member. The pair of sockets cooperate with the other member to pivotally support the latter for pivotal movement in a second plane substantially perpendicular to the first plane. At least one spring clip disposed between the other member and one of the pair of sockets biases the pair of sockets into engagement with the wall of the cavity. The one spring clip maintains the pair of sockets in an expanded position to prevent withdrawal of the other member and the pair of sockets from the cavity.

In particular, the wall of the cavity forms a partial cylinder which matches a cylindrical outer surface on the pair of sockets. Each socket includes a projection and the other member includes an opening for receiving each projection. The pair of sockets are made from a thermoplastic material, such as a glass reinforced polyphenylene, or from a thermoset or sintered metal so that the pair of sockets are self lubricating for movable engagement with the wall of the cavity. The spring clip is substantially M-shaped to define a pocket for receiving each projection. Flexible tabs on the U-shaped spring clip are deformable by a socket to generate a force biasing the latter into engagement with the wall of the cavity or the U-shaped spring clip may be bowed to provide spring bias. If a pair of U-shaped spring clips are used, each clip is provided with one tab to bias the pair of sockets to a rotated position in the same direction.

An alternate embodiment provides projections on the other member which are receiving in openings on each pair of sockets.

It is a primary object of the present invention to provide a universal joint which is simple and economical to manufacture and assemble.

It is another object of the present invention to provide a pair of members with a universal joint therebetween. One of the members includes a cavity for receiving the other member and a pair of sockets are disposed within the cavity to rotate with the other member in a first plane relative to the one member. The pair of sockets also releasably mount the other member to permit the latter to rotate in a second plane which is substantially perpendicular to the first plane.

DETAILED DESCRIPTION

Figure 1:
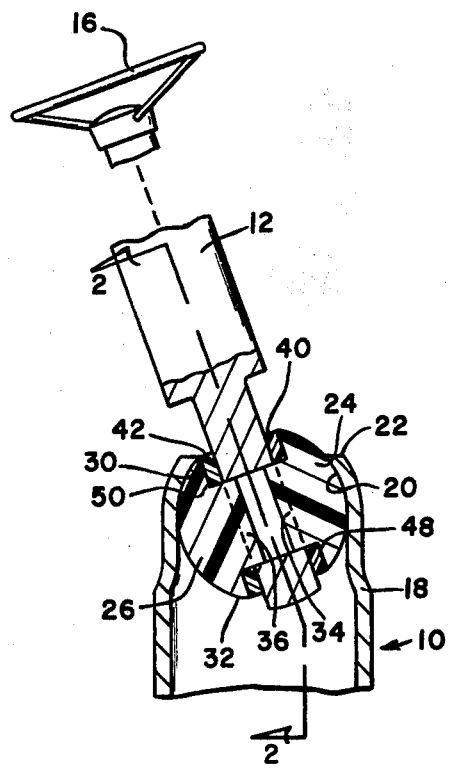
FIG. 1 is a front cross-sectional view of a pair of members having a universal joint therebetween in accordance with the present invention.

A pair of members 10 and 12 is illustrated in FIG. 1. The one member 10 can be coupled to a steering gear 14 while the other member 12 can be coupled to a steering wheel 16. The one member 10 forms a tubular end 18 terminating in a cylindrically shaped cavity 20. An opening 22 receives the other member 12 and a pair of sockets 24 and 26 are rotatably disposed within the cavity 20. The inner wall 30 of cavity 20 and the outer surface 32 of the pair of sockets are substantially cylindrical in shape.

The pair of sockets each include projections 34 and 36 extending inwardly and the member 12 forms an opening 38 for receiving the projections. The pair of sockets 24 and 26 and the other member 12 are rotatably disposed within the cavity 20 for rotation in a first plane relative to the one member 10. Viewing FIG. 1, the projections 34 and 36 rotatably support the other member 12 for rotation in a second plane relative to the pair of sockets and the one member. The second plane is substantially perpendicular to the first plane.

Figure 2:
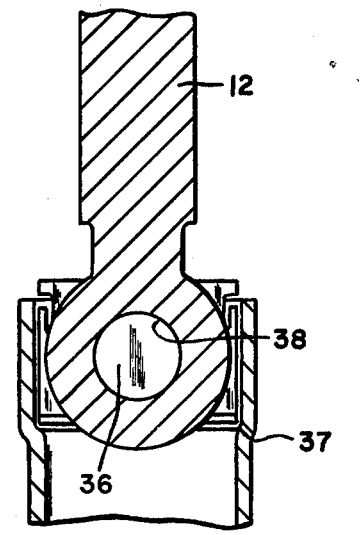
FIG. 2 is a cross-sectional view taken along line 2—2 of FIG. 1.

Turning to FIG. 2, a shoulder 37 formed on the member 10 opposes the pair of sockets 24 and 26 to prevent the latter from extending completely within the member 10. The shoulder may be curved to support the pair of sockets evenly over their lower surface edges.

Figure 4:
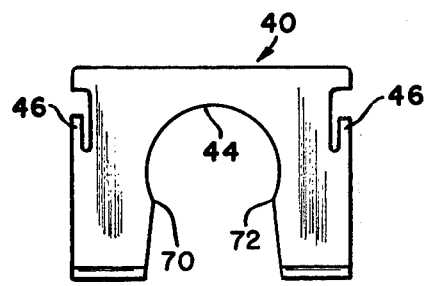
FIG. 4 is a view of a spring clip used in FIG. 1.

In order to retain the pair of sockets 24 and 26 and the other member 12 within the cavity 20, a pair of snap rings or spring clips 40 and 42 are releasably carried by the projections 34 and 36. Turning to FIG. 4, the spring clip 40 is shown as substantially U-shaped with a pocket 44 for receiving either projection 34 or 36. The spring clip forms one or more outwardly extending resilient tabs 46, or may be bowed in section to provide resiliency.

When the pair of members 10 and 12 are to be joined together to form a universal joint, the pair of sockets 24 and 26 are engaged with the member 12 so that the projections 34 and 36 are fully inserted into the opening 38. At this time inner faces 48 and 50 are in contact with the end of member 12 adjacent opening 38. Next, the member 12 and the pair of sockets 24 and 26 are inserted, as a unit, into the cavity 20 via opening 22. The pair of sockets are expanded until their cylindrical outer surfaces contact the cavity wall 30. The spring clips are inserted within the clearance between the member 12 and the pair of sockets to bias the latter into engagement with the cavity wall. The transverse dimension of the pair of sockets in their expanded condition is larger than the transverse dimension of the opening 22 so that the other member is prevented from separating from the one member.

It is possible to provide a corresponding recess (not shown) on the pair of sockets at the inner faces 48 and 50 for the purpose of receiving the tab or tabs 46. Such an arrangement releasably locks the spring clips within the clearance between the other member and the inner faces 48 and 50.

Figure 3:
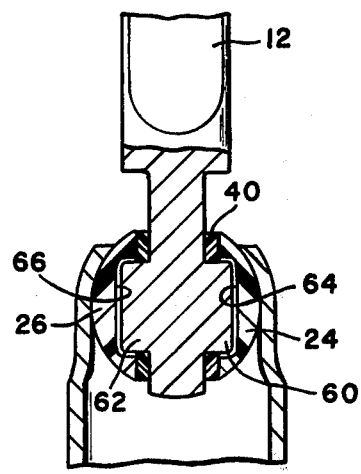
FIG. 3 is a front cross-sectional view similar to FIG. 1, of an alternate embodiment.

Turning to FIG. 3, an alternate embodiment shows the other member 12 having outwardly extending projections 60 and 62 which are received in cavities or recesses 64 and 66 on respective sockets 24 and 26. In this alternate embodiment, the spring clips 40 and 42 are releasably connected to the other member projections 60 and 62 rather than to the socket projections 34 and 36, as shown in FIG. 1. With both embodiments, an optional pair of bumps 70 and 72, see FIG. 4, are provided on the surface of pocket 44. These bumps are deformable upon attachment of the spring clips to either projections 34, 36, 60 or 62 and resist withdrawal of the spring clips from the projections.

Preferably, the pair of sockets are made from a thermoplastic material, such as a glass reinforced polyphenylene, to provide inherent lubrication between the sockets and the wall of the cavity 20.

There are many variations and/or modifications to the universal joint described herein and it is intended that these variations and/or modifications be included within the scope of the appended claims.

I claim:

1. In a joint for connecting a pair of members which transmit rotation between said pair of members, one of said members defining a cavity for receiving a portion of said other member, a pair of sockets rotatably disposed within said cavity for rotation in a first plane, one of said pair of sockets including means to pivotally secure said other member for rotation in a second plane substantially perpendicular to said first plane, and means releasably cooperating with said pair of sockets and said other member to prevent separation between said pair of members when said means is coupled with one of said sockets and to permit separation between said members when said means is spaced from said one socket, said means comprising at least one spring clip disposed between said other member and one of said pair of sockets and said one spring clip being releasably coupled to said one socket.

2. In a universal joint formed between a pair of members, which transmits torque therebetween, one of said members including a cavity for receiving the other of said pair of members, a pair of sockets engageable with the wall of said cavity and with said other member, said pair of sockets defining a contracted position relative to said other member to permit said other member and said pair of sockets to be inserted into said cavity, and a spacer cooperating with said pair of sockets to define an expanded position for said pair of sockets relative to said other member to prevent said pair of sockets from separating from said one member, said spacer comprising a pair of spring clips which bias said pair of sockets into engagement with said cavity wall.

3. In a universal joint formed between a pair of members which transmit torque therebetween, one of said members including a cavity for receiving said other member, a pair of sockets being disposed within said cavity, said pair of sockets and said other member being rotatable in a first plane relative to said one member and said other member being rotatable in a second plane relative to said pair of sockets and said one member, said pair of sockets including means to rotatably mount said other member within said socket and said means also cooperating with said other member to retain said other member within said cavity, and at least one spring clip cooperating with said other member and said pair of sockets to bias said pair of sockets into engagement with the wall of said cavity, said one spring clip being removable from said other member and said pair of sockets to permit separation of said other member and said pair of sockets from said cavity, and said one spring clip being substantially U-shaped to define a pocket, said pair of sockets including projections, and one of said projections extending into said pocket.

* * * * *